(12) United States Patent
Fong et al.

(10) Patent No.: US 12,536,457 B2
(45) Date of Patent: Jan. 27, 2026

(54) PARALLEL QUANTUM EXECUTION

(71) Applicant: Dell Products L.P., Round Rock, TX (US)

(72) Inventors: Victor Fong, Medford, MA (US); Orlando Xavier Nieves, Stoughton, MA (US); Kenneth Durazzo, Morgan Hill, CA (US); Dale R. Bremner, Wrentham, MA (US); Benjamin Santaus, Somerville, MA (US)

(73) Assignee: Dell Products L.P., Round Rock, TX (US)

( * ) Notice: Subject to any disclaimer, the term of this patent is extended or adjusted under 35 U.S.C. 154(b) by 1011 days.

(21) Appl. No.: 17/570,845

(22) Filed: Jan. 7, 2022

(65) Prior Publication Data

US 2023/0222372 A1    Jul. 13, 2023

(51) Int. Cl.
*G06N 10/20* (2022.01)
*G06N 10/80* (2022.01)

(52) U.S. Cl.
CPC ............. *G06N 10/20* (2022.01); *G06N 10/80* (2022.01)

(58) Field of Classification Search
CPC ........ G06N 10/20; G06N 10/80; G06F 30/27; G06F 2115/10; G06F 2111/08; G06F 30/20
See application file for complete search history.

(56) References Cited

U.S. PATENT DOCUMENTS

| 8,818,988 | B1 | 8/2014 | Brown et al. |
| 10,484,479 | B2 | 11/2019 | Johnson et al. |
| 10,997,519 | B2 | 5/2021 | Gunnels et al. |
| 11,550,696 | B2 | 1/2023 | Durazzo et al. |
| 2002/0118700 | A1 | 8/2002 | Bruckman |
| 2015/0286203 | A1 | 10/2015 | Stattelmann et al. |
| 2017/0147303 | A1 | 5/2017 | Amy et al. |
| 2017/0223094 | A1 | 8/2017 | Johnson et al. |
| 2017/0357539 | A1 | 12/2017 | Dadashikelayeh et al. |
| 2018/0096085 | A1 | 4/2018 | Rubin |
| 2018/0240032 | A1 | 8/2018 | Van Rooyen |
| 2018/0293697 | A1 | 10/2018 | Ray et al. |
| 2019/0042677 | A1 | 2/2019 | Matsuura et al. |
| 2020/0104739 | A1 | 4/2020 | Sharma et al. |
| 2020/0142721 | A1* | 5/2020 | Chiba ................ G06F 7/58 |
| 2020/0159586 | A1 | 5/2020 | Chandramoorthy et al. |
| 2020/0218787 | A1 | 7/2020 | Doi |

(Continued)

FOREIGN PATENT DOCUMENTS

WO    WO-2019008241 A1 *  1/2019  ............. G06N 10/00
WO    WO-2020081805 A1 *  4/2020

OTHER PUBLICATIONS

Niu, S., Todri-Sanial, A., "How Parallel Circuit Execution Can Be Useful for NISQ Computing?", Dec. 2021, Arxiv, https://arxiv.org/pdf/2112.00387 (Year: 2021).*

(Continued)

*Primary Examiner* — Emerson C Puente
*Assistant Examiner* — Emily Gorman Leathers
(74) *Attorney, Agent, or Firm* — Workman Nydegger

(57) ABSTRACT

Parallel quantum circuit execution is disclosed. When executing a quantum circuit, runtime characteristics of multiple quantum processing units are predicted and some of the quantum processing units are selected. The quantum circuit is executed in parallel at the selected quantum processing units.

20 Claims, 6 Drawing Sheets

(56) References Cited

U.S. PATENT DOCUMENTS

| | | | | |
|---|---|---|---|---|
| 2021/0406151 | A1* | 12/2021 | Durazzo | G06N 10/80 |
| 2022/0309374 | A1* | 9/2022 | Gonciulea | G06F 30/27 |
| 2022/0327413 | A1* | 10/2022 | Zhang | G06N 10/80 |
| 2023/0020389 | A1* | 1/2023 | Davis | G06F 9/5038 |
| 2023/0222376 | A1 | 7/2023 | Fong et al. | |

OTHER PUBLICATIONS

Sundaram, R. G., Gupta, H., Ramakrishnan, C. R., "Efficient Distribution of Quantum Circuits", 2021, 35th International Symposium on Distributed Computing (DISC 2021), Schloss Dagstuhl-Leibniz-Zentrum für Informatik (Year: 2021).*

Utrera, G., Farreras, M., and Fornes, J., "Task Packing: Efficient task scheduling in unbalanced parallel programs to maximize CPU utilization", Dec. 2019, Journal of Parallel and Distributed Computing, vol. 134, pp. 37-49, https://doi.org/10.1016/j.jpdc.2019.08.003 (Year: 2019).*

DiAdamo, S., "Distributed Quantum Computing: A path to large scale quantum computing", Aug. 22, 2021, Medium.com, https://medium.com/@stephen.diadamo/distributed-quantum-computing-1c5d38a34c50 (Year: 2021).*

Krupansky, J., "Shots and Circuit Repetitions: Developing the Expectation Value for Results from a Quantum Computer", Jul. 10, 2020, Medium.com, https://jackkrupansky.medium.com/shots-and-circuit-repetitions-developing-the-expectation-value-for-results-from-a-quantum-computer-3d1f8eed398 (Year: 2020).*

Payares, E.D., Martinez-Santos, J.C., "Parallel Quantum Computation Approach for Quantum Deep Learning and Classical-Quantum Models", 2021, Journal of Physics: Conference Series, vol. 2090, Issue 1. (Year: 2021).*

Bisicchia, G., Garcia-Alonso, J., Murillo, J., and Brogi, A., "Distributing Quantum Computations by Shots", Nov. 20, 2023, M. (eds) Service-Oriented Computing. ICSOC 2023. Lecture Notes in Computer Science, vol. 14419, pp. 363-377. (Year: 2023).*

Bisicchia, G., Garcia-Alonso, Murillo, J., Brogi, A., "Dispatching Shots Among Multiple Quantum Computers: An Architectural Proposal", 2023, 2023 IEEE International Conference on Quantum Computing and Engineering (QCE), pp. 195-198. (Year: 2023).*

Bisicchia, G., Clemente, G., Garcia-Alonso, J., Rodriguez, J., D'Elia, M., and Brogi, A., "Distributing Quantum Computations, Shot-wise", Nov. 25, 2024, Arxiv, arXiv:2411.16530 (Year: 2024).*

G. Bisicchia, A. Bocci, J. Garcia-Alonso, J. M. Murillo and A. Brogi, "Cut&Shoot: Cutting & Distributing Quantum Circuits Across Multiple NISQ Computers", 2024, 2024 IEEE (Year: 2024).*

Li, Gushu, Anbang Wu, Yunong Shi, Ali Javadi-Abhari, Yufei Ding, and Yuan Xie. "On the co-design of quantum software and hardware." In Proceedings of the Eight Annual ACM International Conference on Nanoscale Computing and Communication, pp. 1-7. 2021. (Year: 2021).

Salm, Marie, Johanna Barzen, Uwe Breitenbucher, Frank Leymann, Benjamin Weder, and Karoline Wild. "The NISQ analyzer: automating the selection of quantum computers for quantum algorithms." In Symposium and summer school on service-oriented computing, pp. 66-85.) (Year: 2020).

Scevola, Damiano. "Static Analysis of Resources in QASM: Estimation of the Number of Qubits." 2020. (Year: 2020).

Weder, Benjamin, Johanna Barzen, Frank Leymann, and Marie Salm. "Automated quantum hardware selection for quantum workflows." Electronics 10, No. 8 (2021): 984. (Year: 2021).

* cited by examiner

PARALLEL QUANTUM EXECUTION

RELATED APPLICATIONS

This application is related to U.S. application Ser. No. 17/647,374, filed on Jan. 7, 2022, and entitled Dynamic Quantum Compute Insertion, which application is incorporated by reference in its entirety.

FIELD OF THE INVENTION

Embodiments of the present invention generally relate to quantum computing. More particularly, at least some embodiments of the invention relate to systems, hardware, software, computer-readable media, and methods for parallel quantum execution.

BACKGROUND

Over the last few decades, quantum computing has made substantial progress from both software and hardware perspectives. Higher qubit volume is becoming available and as the qubit volume increases, more use cases will be enabled. Even though quantum computing is unlikely to be used as a general-purpose central processing unit (CPU), quantum processing units (QPUs) can be used as accelerators. Current use cases typically relate to optimization, machine learning and simulation. Advancements in software and hardware will enable more use cases, which may be unpredictable.

Quantum execution is probabilistic in nature. When executing a quantum circuit, the circuit is often executed multiple times and each execution is referred to as a shot. By performing multiple shots, the probabilistic outcome is better determined. For example, instead of executing a quantum circuit and determining that qubit (1) results in a 1 and that qubit (2) results in a 0, the quantum circuit may be executed hundreds or thousands of times. This results in a probabilistic outcome indicating that the probability that qubit (1) results in a 1 is about 75% and the probability that qubit (2) results in a 0 is about 25% in this example.

Conventionally, quantum execution is a single thread process because context switching often destroys the quantum states of the qubits. Programming frameworks, as a result, assume a single quantum processing unit. Systems and methods are needed to improve quantum executions.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to quantum computing. More particularly, at least some embodiments of the invention relate to systems, hardware, software, computer-readable media, and methods for executing quantum circuits in parallel. More specifically, embodiments relate to executing quantum circuits in parallel and to executing multiple quantum circuits both automatically and programmatically.

In general, quantum circuits are executed multiple times and each execution is referred to as a shot. The result of executing the quantum circuit is determined from the cumulative results of the individual shots. Embodiments of the invention distribute the shots related to a quantum execution to multiple quantum execution environments (or quantum processing units). The shots for a given iteration or execution can be distributed to both real quantum processing units and/or virtual quantum processing units. A virtual quantum processing unit is executed in classical computer hardware environments while real quantum processing units include real quantum hardware. A real quantum processing unit can also be referred to as a physical quantum processing unit, where physical processing units include real, e.g., physical, quantum hardware.

Embodiments of the invention include mechanisms that allow shots to be executed in a distributed and parallel manner. Shots can be distributed evenly, unevenly, and/or in a time-based manner. The distribution can be performed automatically or programmatically. Further, multiple quantum circuits can also be executed in parallel.

Quantum computing is moving to the edge in light of the ability to use quantum computing hardware in room-temperature situations. Thus, edge-computing using quantum processing units is a possibility. Edge quantum computing can be used for many different applications and may be particularly useful for real-time use cases or time-sensitive applications.

Quantum processing units are often used in hybrid systems. A hybrid system includes classical computing devices (classical processing units) and quantum devices (quantum processing units). A hybrid system performs classical-quantum computing. The classical processing unit provides the circuit and parameters that are executed by the quantum processing unit. After executing the quantum circuits and taking measurements, the classical processing unit may use classical computing devices (e.g., CPU central processing unit or processors) and/or accelerators to determine the next set of quantum circuit and parameters to be executed by the quantum processing unit.

Embodiments of the invention perform parallel quantum execution and performance is improved. Embodiments of the invention relate to mechanisms to orchestrate workloads across quantum processing environments including edge-quantum processing environments.

Figure 1:
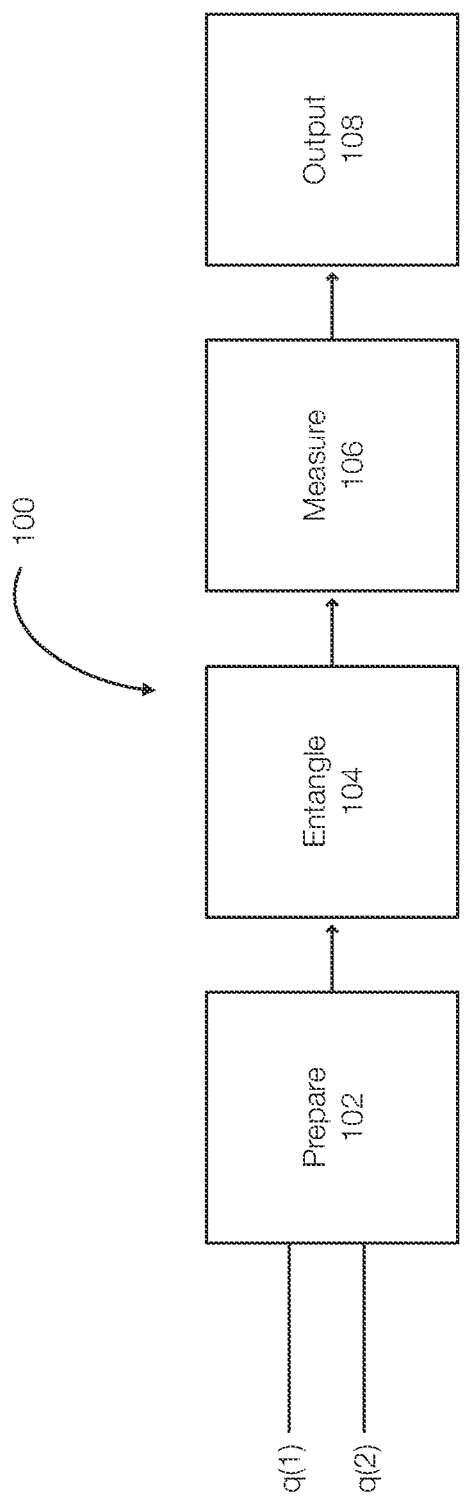
FIG. 1 discloses aspects of an example quantum circuit.

FIG. 1 discloses aspects of a quantum circuit. FIG. 1 illustrates an example of a quantum circuit 100. The circuit 100 is provided by way of example only and embodiments of the invention are not limited to any particular type of quantum circuit. Generally, the circuit 100 may receive qubits (e.g., q(1) and q(2)) as inputs. The qubits are initialized or prepared 102 to a particular state. Stated differently, the input qubits may be initialized based on parameters. In effect, the parameters can be viewed as the input to the circuit 100.

Once prepared, the circuit 100 can be operated or executed. Operating the circuit 100 a single time is referred to herein as a shot. In this execution, the qubits may be entangled 104 (e.g., using quantum gates or the like). The qubits are then measured 106 and recorded as output 108. Because the output 108 of the circuit 100 is probabilistic in nature, a given process may perform a plurality of shots (e.g., hundreds or thousands) for each iteration. The output 108 is returned after all shots have been performed.

The circuit 100 can be implemented in a real quantum processing unit (QPU) or a virtual or simulated quantum processing unit (vQPU). A vQPU is typically implemented in classical hardware, which includes at least a processor, memory, and related hardware components.

Quantum circuits, such as the circuit 100, can be used for various purposes. Quantum circuits may be used, by way of example only, to perform optimizations, machine learning, simulation, and the like. Hybrid classical-quantum computing benefits from close integration between the classical processing units and the quantum processing units.

More specifically, for an application that performs classical-quantum computing, the classical processing unit may generate or identify the quantum circuit and parameters to be executed by the quantum processing unit. After executing the quantum circuits and taking measurements, the classical processing unit can use a processor(s) and classic accelerators to determine the next set of quantum circuits and parameters for the quantum processing unit to execute. Over time, the quantum circuit and parameters may change. As a result, each iteration may use a different quantum processing unit.

Figure 2:
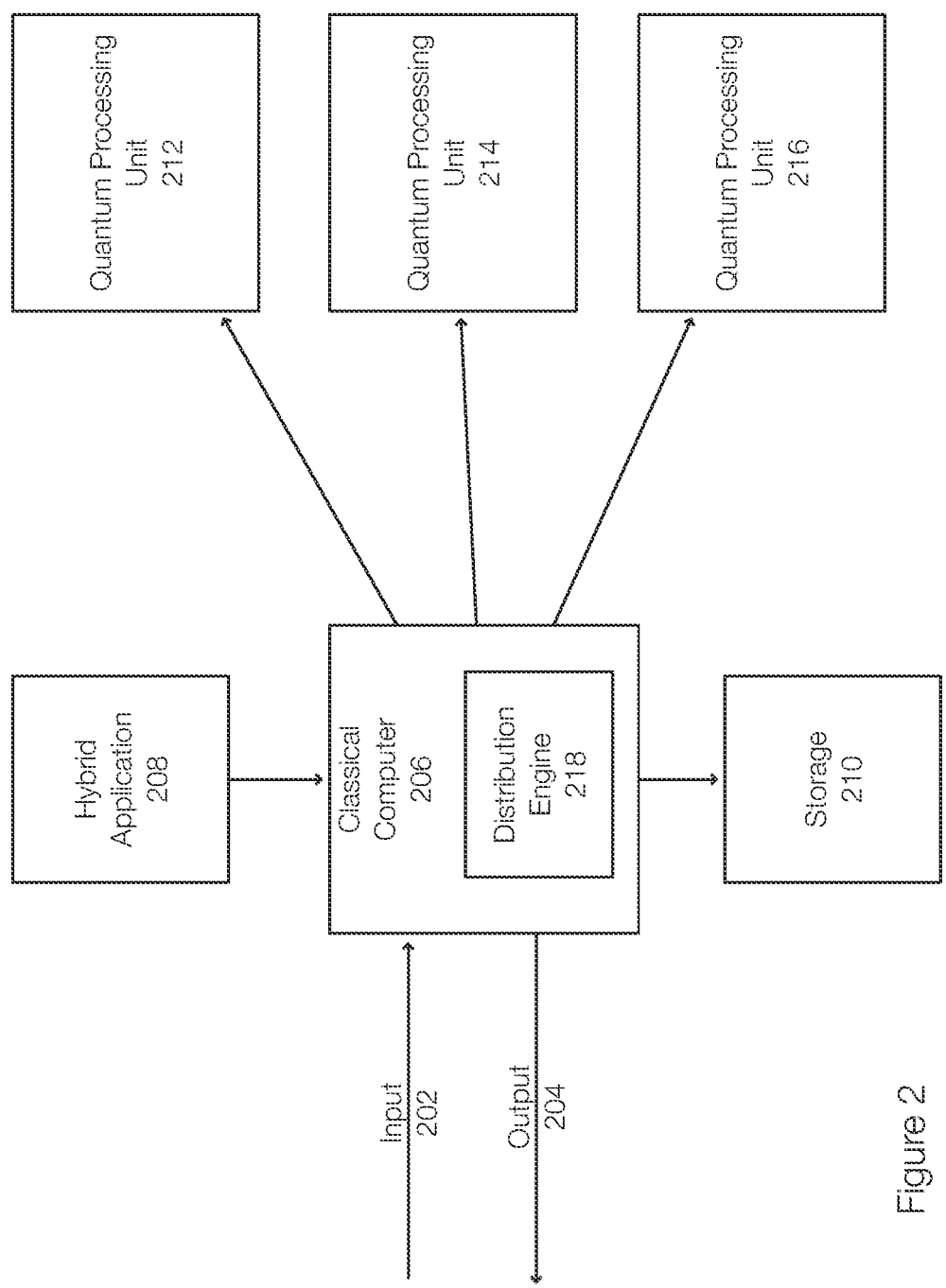
FIG. 2 discloses aspects of a hybrid system, including a classical processing unit and a quantum processing unit, configured to perform applications including hybrid applications.

FIG. 2 discloses aspects of a computing environment that includes classical computing units and quantum processing units and that is configured to perform hybrid classical-quantum computing operations, referred to herein as a hybrid application or a hybrid process. The quantum processing units, represented by quantum processing units 212, 214, and 216, that participate in executing the hybrid application can vary. Further, embodiments of the invention distribute quantum workloads to multiple quantum processing units.

FIG. 2 illustrates a classical computer 206 (an example of a classical processing or computing unit) configured to execute a hybrid application 208 or other application. The computer 206 may represent a stand-alone machine or a computing system including servers. The computer 206 may be implemented in an on-premise system or in the cloud (e.g., a datacenter). The computer 206 thus includes one or more processors, memory, and other circuitry. The computer 206 may also be associated with a storage 210, such as a volume, a storage array, a disk drive, or the like or combination thereof.

The computer 206 may receive input 202 and generate output 204. The input 202 and the output 204 may depend on the application or use-case. For example, the hybrid application 208, which may include classical and/or quantum components or portions, may be configured to train, execute, or optimize a machine learning model, perform cybersecurity, execute financing models, perform artificial intelligence, perform weather forecasting, or the like. The hybrid applications are not limited to these examples and embodiments of the invention are not limited to hybrid applications.

The quantum processing units 212, 214, and 216 may include virtual and/or real quantum processing units. Virtual quantum processing units are configured to simulate a real quantum processing unit using classical hardware such as processors, memory, and the like. Quantum computers are examples of real quantum processing units and classical computers configured to simulate quantum computers are examples of virtual quantum processing units.

More specifically, many different quantum processing units, both real and virtual, may be available for hybrid applications. Many are open-source and others are private offerings. However, the runtime characteristics, infrastructure requirements, and licensing models or costs of these quantum processing units vary.

When executing the hybrid application 208, certain processes or portions thereof may be performed in a quantum environment, such as a quantum processing unit. Further, multiple iterations are performed in the selected quantum processing unit at least because the outputs of quantum processing units are probabilistic in nature and often generate a probability distribution.

Embodiments of the invention include a distribution engine 218 that is configured to manage or control the quantum aspects of the hybrid application 208 in a distributed manner. For example, the classical computer 206 may determine and predict the runtime characteristics and requirements of a quantum execution bundle. The quantum execution bundle, which may include one or more quantum circuits, may be associated with a number of shots (for each quantum circuit) that may be specified as metadata on quantum circuits. If the number of shots is not specified, a default value such as 256, 512, or 1024 shots may be used.

With this data, the distribution engine 218 can determine if parallel execution of the quantum circuit in the quantum execution bundle would satisfy the appropriate requirements. The requirements may be set forth in a service level agreement. The service level agreement may specify requirements such as time to execute, cost, number of shots, preferred quantum providers, or the like.

For example, the service level agreement may indicate that there is sufficient budget but not enough time (performance) to execute the quantum circuit. In this instance, multiple quantum processing units may be selected such that the quantum circuit can be executed in parallel. This allows the time requirement to be satisfied. The quantum processing units selected for parallel execution may include virtual and/or real quantum processing units, different variations of real quantum processing units, or different variations of virtual quantum processing units. By providing these options, the distribution engine 218 can determine how to best satisfy the service level agreement with the available resources or available quantum processing units.

In addition to dynamically selecting multiple quantum processing units for parallel execution, the distribution of shots across the selected quantum processing units may also vary. The distribution can be an even distribution or a distribution based on runtime characteristics or runtime characteristic predictions. Machine learning models may be able to predict the runtime characteristics of various quantum processing units. This information may aid in determining how the shots can be distributed. For example, variations in predicted runtime characteristics may lead to distributing the shot in an uneven manner. Further, the number of quantum processing units selected for execution may vary as well or may depend on the predicted runtime characteristics.

Figure 3:
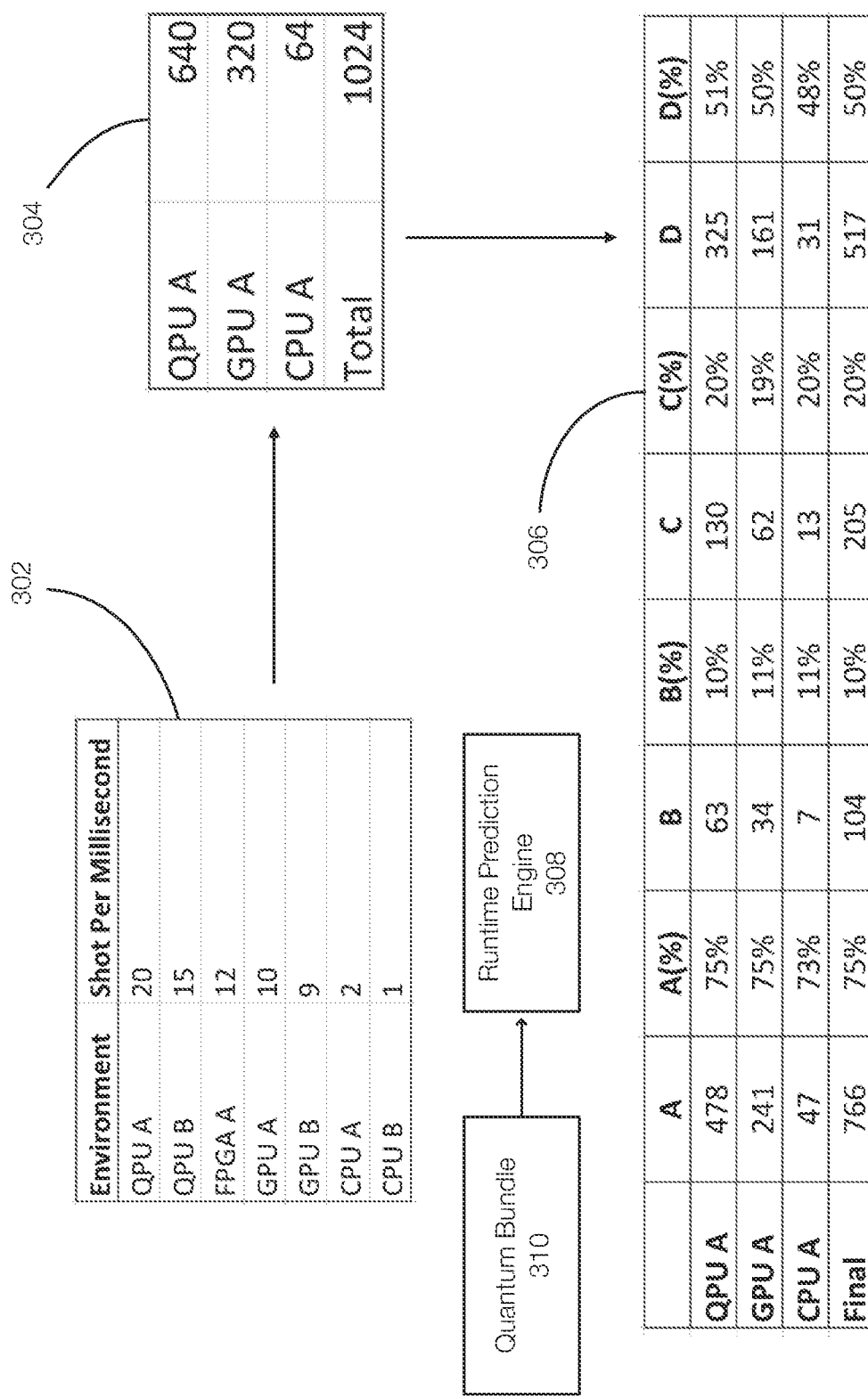
FIG. 3 discloses aspects of executing a quantum circuit in parallel.

FIG. 3 discloses aspects of parallel quantum execution. In FIG. 3, a runtime prediction engine 308 may process a quantum bundle 310. Processing the bundle 310 may include determining a number of qubits, input parameters, and understanding the quantum circuits or gates therein. Using this information, the runtime prediction engine 308 may generate runtime predictions for each of multiple quantum processing units. The predictions may include time required, memory, or the like.

FIG. 3 illustrates a table 302 that includes predictions for a number of quantum processing units. The table includes, as quantum processing units, real quantum processing units QPU A and QPU B and virtual quantum processing units FPGA A, GPU A, GPU B, CPU A and CPU B. The corresponding example expected performance is also illustrated in the table 302. For example, the QPU A is expected to perform 20 shots per millisecond.

During execution of a hybrid algorithm, a quantum execution bundle may be generated. In this example, it is assumed that, from the table 302, quantum processing units QPU A, GPU A, and CPU A are available for use and are selected. If there are 1024 shots to be executed, the distribution engine 218 may use the table 302 or the runtime predictions to distribute the shots to these three quantum processing units (QPU A, GPU A, CPU A).

Because of the differing runtime characteristics, the shots are distributed unevenly in this example. The QPU A performs 640 shots, the GPU A performs 320 shots, and the CPU A performs 64 shots—for a total of 1024 shots.

This illustrates that the execution of this iteration, which includes 1024 shots, is distributed to multiple quantum processing units. The actual number of quantum processing units used in parallel quantum execution may depend on the number of quantum processing units available, the user's service level agreement, time or performance constraints, or the like or combination thereof.

After these three quantum processing units perform the shots, the measurements from each execution can be combined into a single result of probabilistic measurements for all of the qubits. Although the combination of the probabilistic measurements can be performed in different manners, one example is to simply sum the measurements from each execution and divide by the total number of shots.

The table 306 illustrates an example of the measurements performed by the quantum processing units in the table 304 and the resulting measurements. In this example, 4 qubits (A, B, C and D) were measured and the results are presented in the table 306. As illustrated, the results were similar for each of the quantum processing units for each of the qubits. However, the total execution time is reduced. Assuming that the outputs are that each of the qubits was a 1, qubits A, B, C, and D were 1 75%, 10%, 20% and 50% of the time, respectively.

In another example, the shot distribution can be based on time. In this example, the quantum processing units race toward the goal number of shots at the same time. This mechanism is useful when the performance characteristics cannot be accurately predicted or for other reasons.

In this example of a time-based distribution, the various quantum processing units are executed in parallel and report measurements, e.g., performance-related measurements, back to the classical computer intermittently or periodically (e.g., every 10 shots). Results may be reported periodically or intermittently in other distributions. In this example, the classical computer may keep track of the measurements and the total number of shots executed across all environments. When the total or required number of shots have been performed, quantum execution in the quantum processing units is terminated.

Parallel quantum executions can be programmatically bundled, particularly for hybrid applications. In addition to parallel shot distribution and execution, many processes, including hybrid processes, require the execution of many quantum circuits. These circuits can be executed in parallel to reduce overall execution times. An API (application programming interface) may be provided that allows multiple quantum circuits to be submitted to the hybrid system. This allows the quantum circuits to be distributed to different quantum processing units and executed in parallel.

The distribution may be based on predicted runtime characteristics for the various circuits. Thus, the runtime characteristics for each quantum processing unit for each quantum circuit can be determined. This allows the quantum circuits to be distributed in a manner to optimize the overall performance based on the predicted runtime characteristics.

Figure 4:
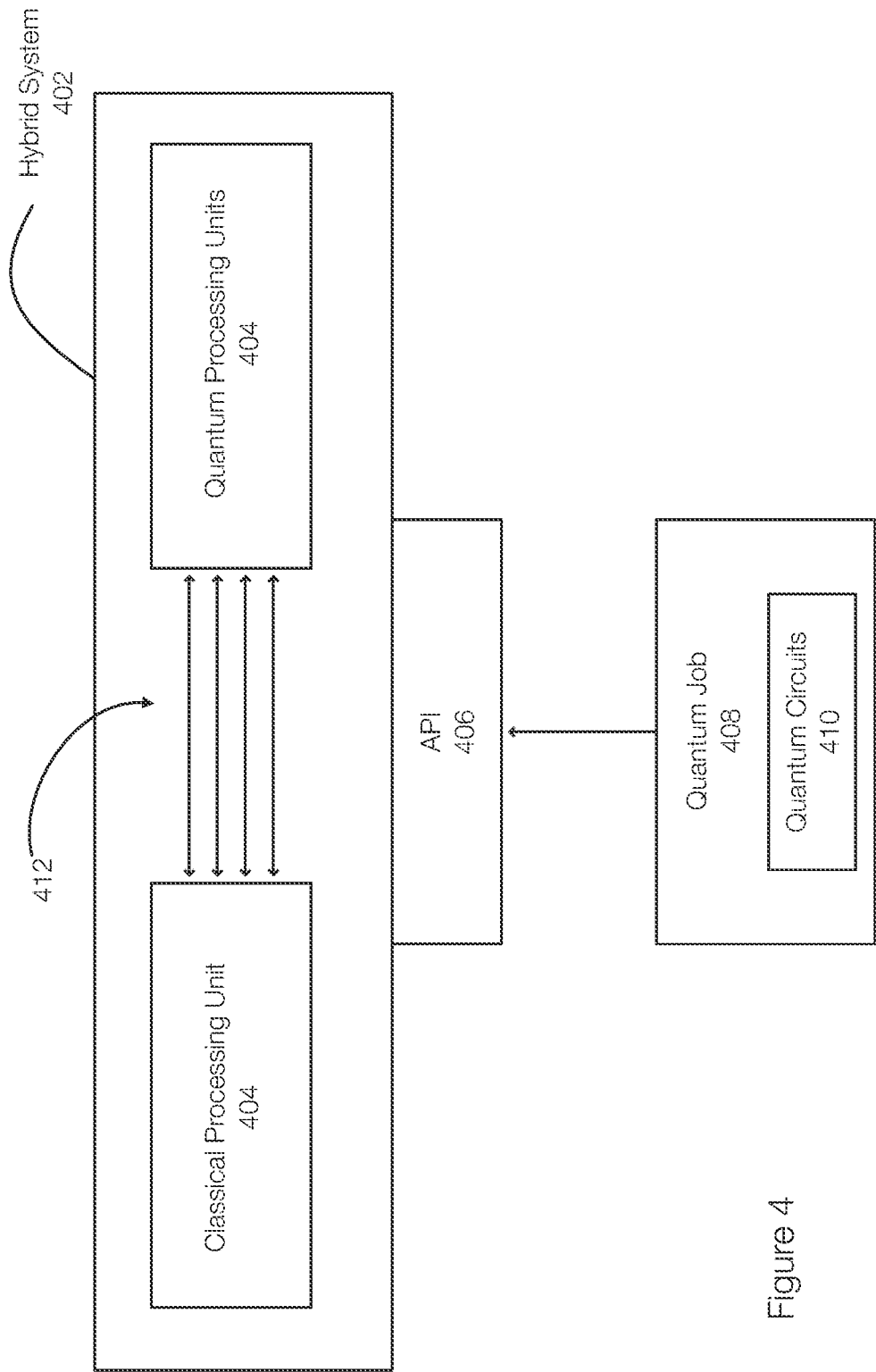
FIG. 4 discloses aspects of an application programming interface for programmatic quantum circuit execution.

FIG. 4 discloses aspects of programmatic bundling and automatic distribution. FIG. 4 illustrates a hybrid system 402. The hybrid system 402 includes a classical processing unit 404 (processors, memory, etc.) and quantum processing units 404 (one or more of virtual quantum processing units and one or more of real quantum processing units). The arrows 412 represent parallel distribution and/or parallel execution.

In this example, an API 406 (Application Programming Interface) may be provided that allows a quantum job 408 to be submitted to the hybrid system 402. The quantum job 408 may include quantum circuits 410 (or other tasks) to be performed by the hybrid system 402 and more specifically by the quantum processing units 404. The API 406 allows multiple quantum circuits 410 to be submitted simultaneously and programmatically in a single job 408.

Once the quantum job 408 is submitted, the hybrid system 402 may determine scheduling for each of the quantum circuits 410 included in the quantum job 408. As previously discussed, the execution of a quantum circuit can be distributed to multiple quantum processing units, each performing shots. Similarly, the quantum circuits 410 in the quantum job 408 can also be distributed and executed in parallel by the quantum processing units 404.

Because the quantum job 408 may include aspects performed by classical processing units 404, these aspects can be orchestrated in a separated environment, such as containers across multiple nodes or servers. If the quantum execution environment is virtual, the environment can be orchestrated in a similar manner, such as in containers. If the environment requires quantum hardware, the quantum hardware environments can be reserved for the time needed for all quantum circuit executions.

Thus, the quantum circuits 410 can be processed to predict an appropriate quantum environment for each of the quantum circuits 410. By way of example only, the quantum circuits 410 can be processed to predict the best, or optimal, quantum environment for each of the quantum circuits 410. In addition, it may also be possible to further distribute the shots of each quantum circuit. Quantum circuit execution results can be returned intermittently, at completion, or in another manner. Quantum processing units may be selected using, for example, a greedy search, a heuristic search, reinforced learning, linear programming, or the like.

Figure 5:
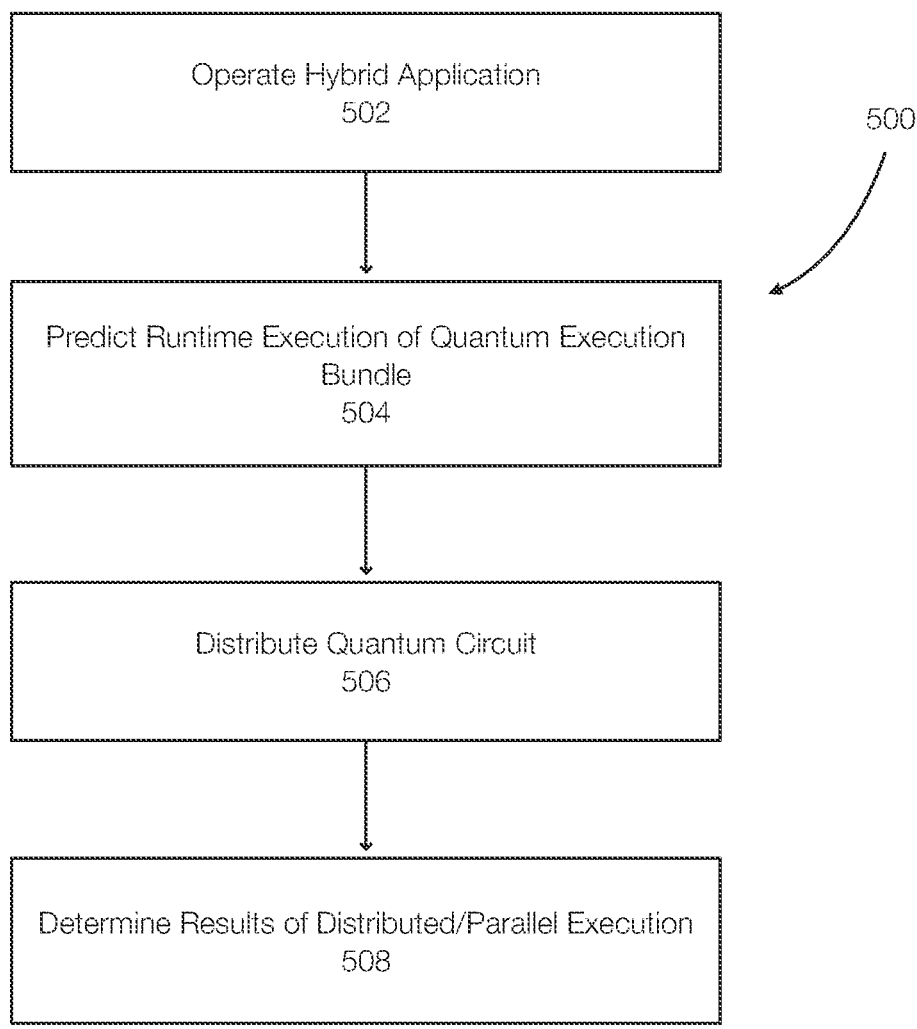
FIG. 5 discloses aspects of performing parallel quantum circuit execution.

FIG. 5 discloses aspects of a method for executing quantum circuits. The method 500 may include elements that are performed in an ongoing manner and/or elements that may be performed less frequently than other elements. In the method 500, a hybrid application (or other application) is operated 502 or executed. The application is operated in an environment that may include (or has access to) both classical processing units and quantum processing units (real and virtual). In this example, operating 502 the hybrid application may include receiving or identifying a quantum bundle at a hybrid or other system. The quantum bundle may include a quantum circuit. Next, runtime execution characteristics are determined or predicted 504 for the quantum circuit. By way of example only, the predictions may include expected runtime and/or may include an identification of quantum processing units that will run the quantum circuit in an optimal manner.

Based on the runtime characteristics, the quantum circuit is distributed 506 to multiple quantum processing units. Distributing the quantum circuit (or quantum circuits) may include selecting which of the quantum processing units will be used. These may be identified, by way of example only, using a greedy search, a heuristic search, linear programming, and/or a reinforced learning mechanism. The quantum processing units selected to execute the quantum circuit may include real and/or virtual quantum processing units.

The quantum circuit is distributed 500 in an even manner, an uneven manner, or a time-based manner. Results from execution of the quantum circuit may be determined 508 intermittently, after execution, or in another manner.

In one example, a single quantum circuit is distributed by having each of the selected quantum processing units execute shots of the quantum circuit. The execution is completed in a manner related to the type of distribution as previously described.

The method 500 may also apply to a situation where a job is received that may include multiple quantum circuits or multiple quantum execution units. The quantum circuits can be distributed such that each of the selected quantum processing units executes at least one quantum circuit. In another example, the distribution may have two levels. First, the quantum circuits may be distributed. Second, shots for each of the quantum circuits may also be distributed. Thus, each of the selected quantum processing units may be executing all shots of at least one quantum circuit. With at least two levels of distribution, each of the selected quantum processing units may be executing a certain number of shots of a particular quantum circuit.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, hybrid operations or applications including classical-quantum algorithms or processes.

New and/or modified data collected and/or generated in connection with some embodiments, may be stored in an environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment.

Example cloud computing environments, which may or may not be public, include storage environments that may provide data or processing functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, virtual machines (VM), containers or microservices.

Particularly, devices in the operating environment may take the form of software, physical machines, VMs, containers, microservices, or any combination of these, though no particular device implementation or configuration is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: predicting runtime characteristics of a quantum circuit for each of a plurality of quantum processing units, selecting quantum processing units from the plurality of quantum processing units, distributing the quantum circuit to the selected quantum processing units, and executing the quantum circuit at each of the selected quantum processing units in parallel.

Embodiment 2. The method of embodiment 1, wherein execution of the quantum circuit includes executing the quantum circuit a certain number of shots, wherein the selected quantum processing units includes real quantum processing units and/or virtual quantum processing units.

Embodiment 3. The method of embodiment 1 and/or 2, further comprising distributing the shots in an even manner such that each of the selected quantum processing units executes an equal part of the certain number.

Embodiment 4. The method of embodiment 1, 2, and/or 3, further comprising distributing the shots in an uneven manner such that at least one of the selected quantum processing units executes a different number of shots than the other selected quantum processing units.

Embodiment 5. The method of embodiment 1, 2, 3, and/or 4, further comprising distributing the shots in a time-based manner such that the selected quantum processing units race to perform the certain number of shots.

Embodiment 6. The method of embodiment 1, 2, 3, 4, and/or 5, further comprising receiving measurements intermittently from each of the selected quantum processing units, wherein execution of the quantum processing units is terminated when the certain number of shots has been performed.

Embodiment 7. The method of embodiment 1, 2, 3, 4, 5, and/or 6, further comprising predicting the runtime characteristics using at least one machine learning model.

Embodiment 8. A method, comprising: receiving a job at a hybrid system that includes or has access to a classical processing unit that includes processors and memory and to a plurality of quantum processing units including virtual quantum processing units and virtual processing units, wherein the job includes quantum circuits, predicting runtime characteristics of each of the plurality of quantum processing units for each of the quantum circuits in the job, selecting quantum processing units from the plurality of quantum processing units to execute the quantum circuits, distributing the quantum circuits to the selected quantum processing units, and executing the quantum circuits at the selected quantum processing units in parallel.

Embodiment 9. The method of embodiment 8, further comprising distributing the quantum circuits in an even manner to the selected quantum processing units.

Embodiment 10. The method of embodiment 8 and/or 9, further comprising distributing the quantum circuits in an uneven manner to the selected quantum processing units.

Embodiment 11. The method of embodiment 8, 9, and/or 10, further comprising distributing the quantum circuits to the selected quantum processing units in a time-based manner.

Embodiment 12. The method of embodiment 8, 9, 10, and/or 11, further comprising distributing each of the quantum circuits such that shots of each of the quantum circuits are distributed to different quantum processing units.

Embodiment 13. The method of embodiment 8, 9, 10, 11, and/or 12, further comprising predicting the runtime characteristics using at least one machine learning model.

Embodiment 14. A method for performing any of the operations, methods, or processes, or any portion of any of these or any combination thereof, disclosed herein.

Embodiment 15. A non-transitory storage medium having stored therein instructions that are executable by one or more hardware processors to perform operations comprising the operations of any one or more of embodiments 1 through 15.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' or 'engine' may refer to software objects or routines that execute on the computing system. The different components, modules, engines, and services described herein may be implemented as objects or processes that execute on the computing system or in a quantum processing unit, for example, as separate or parallel threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
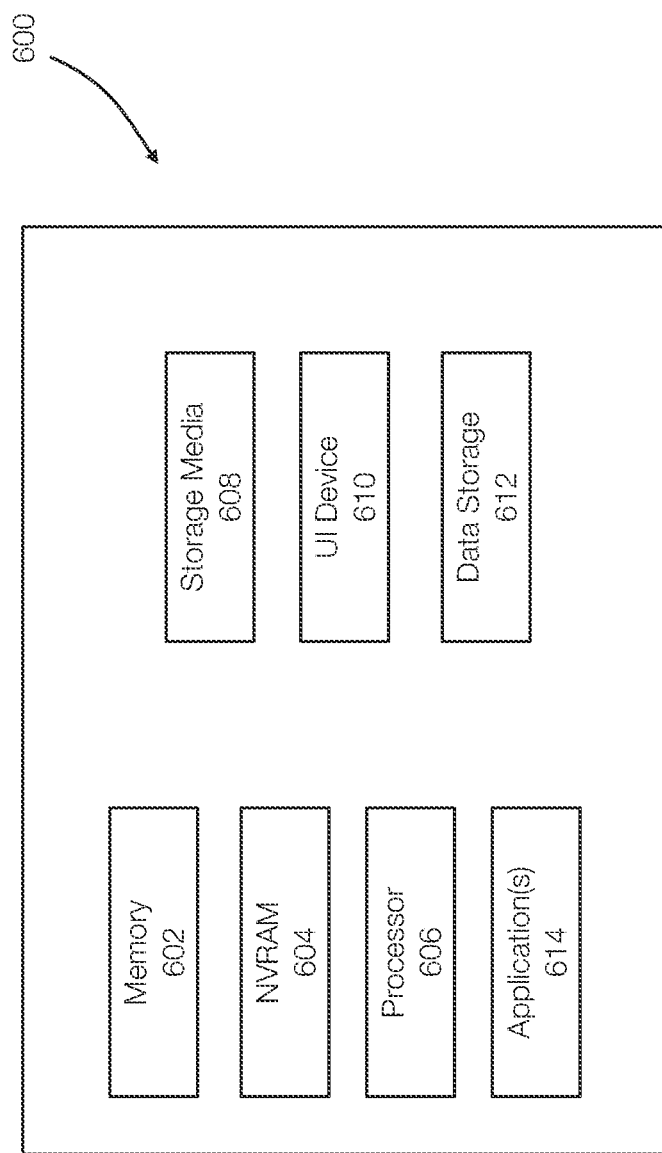
FIG. 6 discloses aspects of a computing device or system.

With reference briefly now to FIG. 6, any one or more of the entities disclosed, or implied, by the Figures and/or elsewhere herein, may take the form of, or include, or be implemented on, or hosted by, a physical computing device or a physical quantum device, one example of which is denoted at 600.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   predicting runtime characteristics of a quantum circuit for each of a plurality of quantum processing units;
   selecting quantum processing units from the plurality of quantum processing units;
   determining a total number of shots for the quantum circuit;
   determining a number of shots to be performed at each of the selected quantum processing units, wherein the number of shots for each of the selected quantum processing units sum to the total number of shots;
   distributing the quantum circuit to each of the selected quantum processing units;
   executing the quantum circuit at each of the selected quantum processing units in parallel by performing the corresponding determined number of shots at the selected quantum processing units; and
   receiving measurements from each of the selected quantum processing units; and
   determining a result of the quantum circuit from the all of the measurements received the selected quantum processing units.

2. The method of claim 1, wherein the selected quantum processing units includes real quantum processing units, virtual quantum processing units or both real quantum processing units and virtual quantum processing units.

3. The method of claim 2, further comprising distributing the total number of shots in an even manner such that the determined number of shots for each of the quantum processing units is the same.

4. The method of claim 2, further comprising distributing the total number of shots in an uneven manner such that at least one of the selected quantum processing units executes a different number of shots than the other selected quantum processing units.

5. The method of claim 2, further comprising distributing the total number of shots in a time-based manner such that the selected quantum processing units race to perform the corresponding determined number of shots.

6. The method of claim 5, further comprising receiving the measurements intermittently from each of the selected quantum processing units, wherein execution of the quantum processing units is terminated when the total number of shots has been performed.

7. The method of claim 1, further comprising predicting the runtime characteristics using at least one machine learning model.

8. A method, comprising:
   receiving a job at a hybrid system that includes or has access to a classical processing unit that includes processors and memory and to a plurality of quantum processing units, wherein the job includes quantum circuits;
   predicting runtime characteristics of each of the plurality of quantum processing units for each of the quantum circuits in the job;
   determining a total number of shots for each of the quantum circuits;
   for each quantum circuit:
     selecting quantum processing units from the plurality of quantum processing units to execute the quantum circuit;
     determining a number of shots for each of the selected quantum processing units;
     distributing the quantum circuit to the selected quantum processing units, wherein each of the selected quantum processing units performs the corresponding determined number of shots such that the shots are performed in parallel at the selected quantum processing units; and
     returning measurements to the hybrid system; and
   determining a result of the quantum circuit from the all of the measurements received by the hybrid system.

9. The method of claim 8, further comprising distributing the total number of shots for each of the quantum circuits in an even manner to the selected quantum processing units.

10. The method of claim 8, further comprising distributing the total number of shots for each of the quantum circuits in an uneven manner to the selected quantum processing units.

11. The method of claim 8, further comprising distributing the total number of shots for each of the quantum circuits to the selected quantum processing units in a time-based manner.

12. The method of claim 8, wherein the determined number of shots may be different for each of the selected quantum processing units.

13. The method of claim 8, further comprising predicting the runtime characteristics using at least one machine learning model.

14. A non-transitory storage medium having stored therein instructions that are executable by one or more hardware processors to perform operations comprising:
   predicting runtime characteristics of a quantum circuit for each of a plurality of quantum processing units;
   selecting quantum processing units from the plurality of quantum processing units;
   determining a total number of shots for the quantum circuit;
   determining a number of shots to be performed at each of the selected quantum processing units, wherein the number of shots for each of the selected quantum processing units sum to the total number of shots;
   distributing the quantum circuit to each of the selected quantum processing units;
   executing the quantum circuit at each of the selected quantum processing units in parallel by performing the corresponding determined number of shots at the selected quantum processing units; and
   receiving measurements from each of the selected quantum processing units; and
   determining a result of the quantum circuit from the all of the measurements received the selected quantum processing units.

15. The non-transitory storage medium of claim 14, wherein the selected quantum processing units includes real quantum processing units, virtual quantum processing units or both real quantum processing units and virtual quantum processing units.

16. The non-transitory storage medium of claim 15, further comprising distributing the total number of shots in an even manner such that the determined number of shots for each of the quantum processing units is the same.

17. The non-transitory storage medium of claim 15, further comprising distributing the total number of shots in an uneven manner such that at least one of the selected quantum processing units executes a different number of shots than the other selected quantum processing units.

18. The non-transitory storage medium of claim 15, further comprising distributing the total number of shots in a time-based manner such that the selected quantum processing units race to perform the certain number of shots.

19. The non-transitory storage medium of claim 18, further comprising receiving the measurements intermittently from each of the selected quantum processing units, wherein execution of the quantum processing units is terminated when the total number of shots has been performed.

20. The non-transitory storage medium of claim 14, further comprising predicting the runtime characteristics using at least one machine learning model.

* * * * *